United States Patent
Busekros et al.

(10) Patent No.: US 9,181,875 B2
(45) Date of Patent: Nov. 10, 2015

(54) GAS TURBINE AIR INTAKE MANIFOLD CONTROLLABLY CHANGING A MECHNICAL RIGIDITY OF THE WALLS OF SAID INTAKE MANIFOLD

(75) Inventors: Armin Busekros, Zurich (CH); Thomas Kramer, Ennetbaden (CH); Jochem Fischer, Untersiggenthal (CH); Juergen Hoffmann, Untersiggenthal (CH)

(73) Assignee: ALSTOM TECHNOLOGY LTD, Baden (CH)

( * ) Notice: Subject to any disclaimer, the term of this patent is extended or adjusted under 35 U.S.C. 154(b) by 775 days.

(21) Appl. No.: 13/434,809

(22) Filed: Mar. 29, 2012

(65) Prior Publication Data

US 2012/0247109 A1  Oct. 4, 2012

(30) Foreign Application Priority Data

Apr. 1, 2011 (CH) ..................................... 00596/11

(51) Int. Cl.
*F02C 7/045* (2006.01)
*F04D 29/66* (2006.01)

(52) U.S. Cl.
CPC .............. *F02C 7/045* (2013.01); *F04D 29/663* (2013.01); *F05D 2260/96* (2013.01)

(58) Field of Classification Search
CPC ... F05B 2260/96; F04D 29/663; F02M 35/12; B64D 2033/0206; F02C 7/045; F02K 1/827; F05D 2260/96
USPC .................... 60/725; 137/15.1; 415/118, 119; 181/214, 229; 244/54 B
See application file for complete search history.

(56) References Cited

U.S. PATENT DOCUMENTS

| | | | |
|---|---|---|---|
| 5,355,417 A * | 10/1994 | Burdisso et al. | ............. 381/71.7 |
| 5,382,134 A | 1/1995 | Pla et al. | |
| 5,386,689 A | 2/1995 | Bozich et al. | |
| 5,423,658 A | 6/1995 | Pla et al. | |
| 5,590,849 A * | 1/1997 | Pla | ................................ 244/1 N |
| 5,618,010 A * | 4/1997 | Pla et al. | ........................ 244/1 N |
| 5,702,230 A | 12/1997 | Kraft et al. | |
| 5,919,029 A | 7/1999 | Van Nostrand et al. | |
| 7,246,480 B2 | 7/2007 | Ritland | |
| 2006/0236973 A1 | 10/2006 | Seibt et al. | |
| 2008/0202848 A1 | 8/2008 | Mueller et al. | |

FOREIGN PATENT DOCUMENTS

| | | |
|---|---|---|
| DE | 19502030 C1 | 2/1996 |
| EP | 1085196 A1 | 3/2001 |
| EP | 1262666 A2 | 4/2002 |

(Continued)

*Primary Examiner* — William H Rodriguez
(74) *Attorney, Agent, or Firm* — Buchanan Ingersoll & Rooney PC

(57) ABSTRACT

An intake manifold is provided for inducting combustion air for a compressor of a gas turbine. The intake manifold includes a plurality of walls that delimit against the environment. Devices are provided for controllable change of the mechanical rigidity of the walls to reduce noise which is generated or is emitted in an air intake region during operation of the gas turbine. A gas turbine is also provided and includes an air intake to which air to be compressed is fed via an intake manifold. The intake manifold having a plurality of walls that delimit against the environment. Devices are provided to controllably change a mechanical rigidity of the walls to reduce noise which is generated or emitted in an air intake region during operation of the gas turbine.

17 Claims, 7 Drawing Sheets

(56) References Cited

FOREIGN PATENT DOCUMENTS

| EP | 1717433 | A2 | 11/2006 |
|---|---|---|---|
| EP | 1913242 | | 10/2008 |
| GB | 2204916 | A | 11/1988 |
| WO | 96/11465 | A1 | 4/1996 |
| WO | 2004072945 | A1 | 8/2004 |
| WO | 2007/017317 | A1 | 2/2007 |

\* cited by examiner

GAS TURBINE AIR INTAKE MANIFOLD CONTROLLABLY CHANGING A MECHNICAL RIGIDITY OF THE WALLS OF SAID INTAKE MANIFOLD

RELATED APPLICATION

The present application hereby claims priority under 35 U.S.C. Section 119 to Swiss Patent application number 00596/11, filed Apr. 1, 2011, the entire contents of which are hereby incorporated by reference.

FIELD OF INVENTION

The present invention relates to the field of gas turbines. It refers to a gas turbine and also to an intake manifold for a gas turbine.

BACKGROUND

In gas turbines, noises develop on account of the rotational movement of the rotor and the blades in conjunction with fluidic effects and are emitted to the outside via the turbine casing, for example. The air intake region of the gas turbine emerges as a particularly powerful source of noise because provision is made there for devices such as the intake manifold (see U.S. Pat. No. 7,246,480 B2) which introduces large air flows into the intake region of the compressor of the gas turbine, and which are equipped with large-area walls, usually constructed from metal sheets, which radiate the internally developed sound easily and effectively to the outside.

FIG. 1 shows an exemplary air intake region of a gas turbine 10 which drives a generator 11 (shown only in outline). The gas turbine 10 has a machine axis 16 around which the rotor (not shown) of a compressor rotates. The compressor has an air intake 12 in the form of an annular intake nozzle ("bell mouth") into which air 15—which may be additionally processed beforehand, e.g. filtered, or provided with an atomized spray—is directed by means of an intake manifold 13.

The intake manifold 13 is delimited on the outside by means of large-area walls 14 which are customarily constructed from metal sheets and are provided with a frame structure and possibly with stiffening struts. The walls 14 can especially be of a double-walled design. The large-area metal sheets in this case act as loudspeaker membranes and emit the sound which propagates inside the air intake region to the outside, largely without being damped.

An active intake silencer for an air intake duct of an internal combustion engine is known from printed publication EP1717433A2, having sensors which are connected to a control unit which actuates a converter. Provision is made for a special heat-resistant and moisture-resistant membrane which is acoustically coupled with the intake air flow in the air intake duct, wherein the surface of the membrane facing the intake air flow is made to flexurally oscillate by means of the converter for producing structure-borne sound which is attuned to the intake air sound. Such an arrangement is only suitable for small flow cross sections and requires a special, additionally installed membrane.

GB2204916A proposes a combination of a passive silencer and an active silencer, operating with loudspeakers, for the intake or exhaust of a gas turbine for noise reduction. The high equipment cost and the fluidic influence of the arrangement are disadvantageous in this case.

For an aircraft power plant, printed publication U.S. Pat. No. 5,423,658 proposes an active silencing system in which the resonance frequency of the sound-radiating structure is tuned so that the sound can be optimally quenched over a large frequency range. For tuning the resonance frequency, provision is made for a multiplicity of actuators which tune the resonance frequency of the metal sheets of the casing in the desired manner. The metal sheets are then made to oscillate by means of attached oscillation transducers in order to create the necessary compensating countering sound. A disadvantage is the comparatively high cost of equipment and control engineering as a result of the actuators and oscillation transducers.

An actively controlled acoustic wall, which is provided for the casings of gas turbines, is known from printed publication U.S. Pat. No. 5,702,230 A. The wall consists of a rear wall, which consists of a planar matrix of individually controllable elements which are arranged side-by-side and in each case comprise a transducer in a honeycomb-like chamber, and an attached front wall. Such an acoustic wall, on account of its small-sized, complicated construction, is extremely costly in production, especially if it involves larger areas.

SUMMARY

The disclosure is directed to an intake manifold for inducting combustion air for a compressor of a gas turbine. The intake manifold includes a plurality of walls that delimit against the environment. Devices are provided for controllable change of the mechanical rigidity of the walls to reduce noise which is generated or is emitted in an air intake region during operation of the gas turbine.

In another embodiment, the disclosure is directed to a gas turbine, which includes an air intake to which air to be compressed is fed via an intake manifold. The intake manifold includes a plurality of walls that delimit against the environment. Devices are provided to controllably change a mechanical rigidity of the walls to reduce noise which is generated or emitted in an air intake region during operation of the gas turbine.

BRIEF DESCRIPTION OF THE DRAWINGS

The invention shall subsequently be explained in more detail based on exemplary embodiments in conjunction with the drawing. In the drawing

FIGS. 7a-9b show different exemplary embodiments for walls according to the invention, which are equipped with piezoelements for the controlled change of the mechanical behavior and in which the piezoelements exert a force which acts parallel to the plane of the wall.

DETAILED DESCRIPTION OF THE PREFERRED EMBODIMENTS

Introduction to the Embodiments

It is therefore an object of the invention to disclose a (particularly stationary) gas turbine and also an intake manifold for a gas turbine, in which the sound which is generated in the air intake region is damped in a particularly simple and efficient manner.

This and other objects are achieved by means of the features of the appended claims.

The invention is based on a gas turbine which for inducting combustion air for a compressor has an air intake to which is fed the air, which is to be compressed, via an intake manifold which has a plurality of walls for delimitation against the environment. The invention is distinguished by the fact that, for reducing the noise which is generated or is emitted in the air intake region during operation of the gas turbine, means are provided for the controllable change of the mechanical rigidity of the walls. Unlike the prior art, in this case only the acousto-mechanical properties of the housing construction are specifically changed in order to damp the acoustic excitation of the walls as a result of the sound which is present in the interior space.

In one development of the invention, the means for the controllable change of the mechanical rigidity of the walls comprise piezoelements which are connected to a control unit.

In particular, the walls comprise wall plates which, with the aid of frames and/or stiffening girders, are mechanically stiffened, wherein the piezoelements are arranged at predetermined points between the wall plates and the frames or stiffening girders in such a way that as a result of their actuation the mechanical rigidity of the wall plates can be changed.

In another development, at least one sound sensor is arranged in the air intake region of the gas turbine, and by the fact that the sound sensor is connected to the control unit.

In particular, the control unit is designed so that, by actuation of the piezoelements in accordance with the measured sound in the air intake region, it influences the rigidity of the walls so that the sound in the air intake region is reduced.

It is especially conceivable, however, that the piezoelements exert a force upon the wall plates which is directed perpendicularly to the plane of the plates.

Similarly, however, it is also easily conceivable that the piezoelements exert a force upon the wall plates which is directed parallel to the plane of the plates. Furthermore, it is conceivable that the wall plates are pretensioned in the plane of the plates and the pretensioning is reduced by means of the piezoelements or even a compression stress is applied in the plane of the plates by means of the piezoelements.

DETAILED DESCRIPTION

Figure 1:
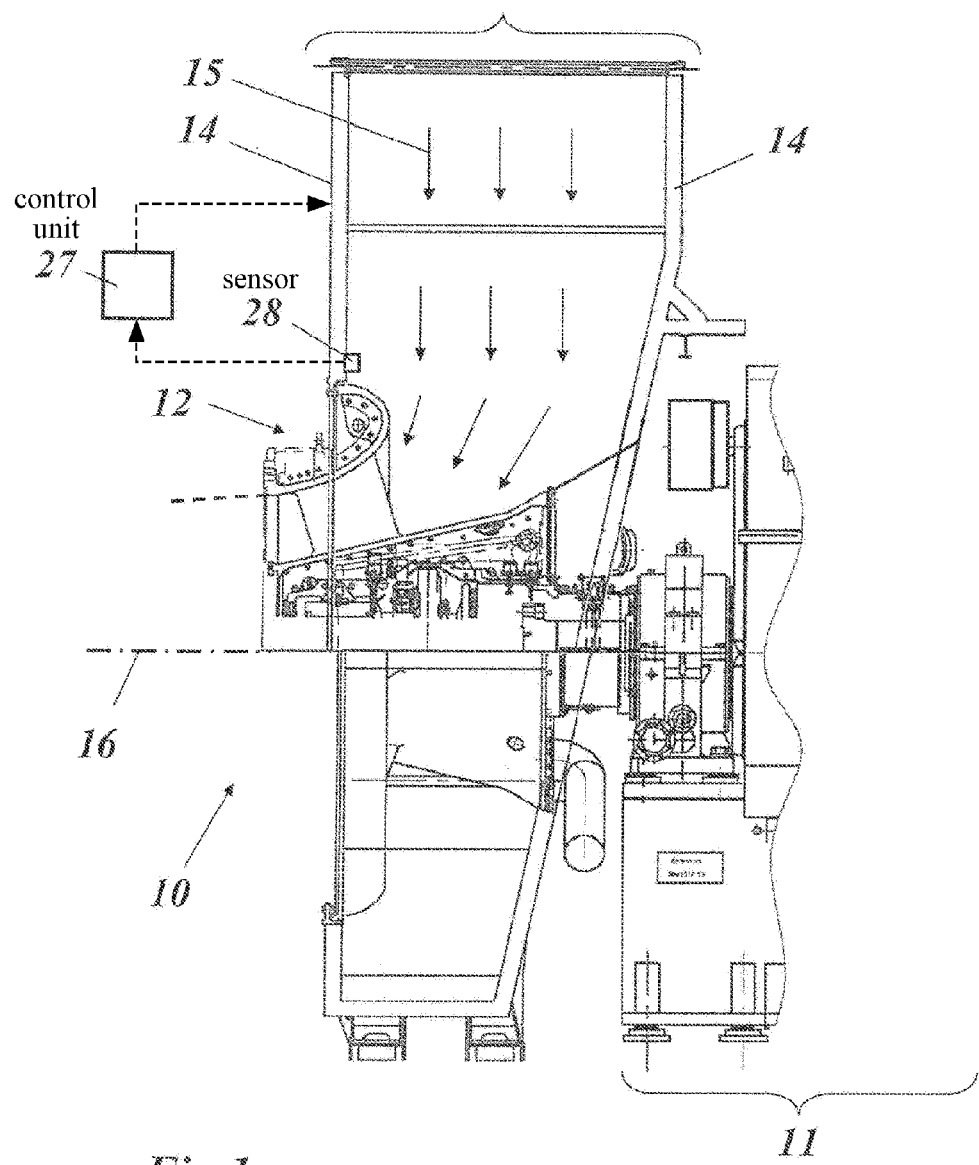
FIG. 1 shows an intake-side detail of a stationary gas turbine with intake manifold according to an exemplary embodiment of the invention.

FIG. 1 shows an intake-side detail of a stationary gas turbine 10 with an intake manifold 13 according to an exemplary embodiment of the invention. The intake manifold 13 is outwardly delimited by walls 14, the mechanical properties of which can be controllably changed by means of installed piezoelements, which are not explicitly shown in FIG. 1. To this end, provision is made for a control unit 27 which receives input signals from at least one sound sensor 28, which is attached on the intake manifold 13 at a suitable point, in order to pick up the sound which occurs there and to transmit the sound in a corresponding signal form to the control unit 27. The control unit 27, in accordance with the fed-in sound signals, emits control signals at an output which serve for actuation of the piezoelements (not shown) in or on the walls 14. It is the purpose of this control unit to influence the mechanical properties, especially the mechanical rigidity, of the walls as a function of the measured sound so that the sound emission to the outside is reduced or minimized.

Figure 2:
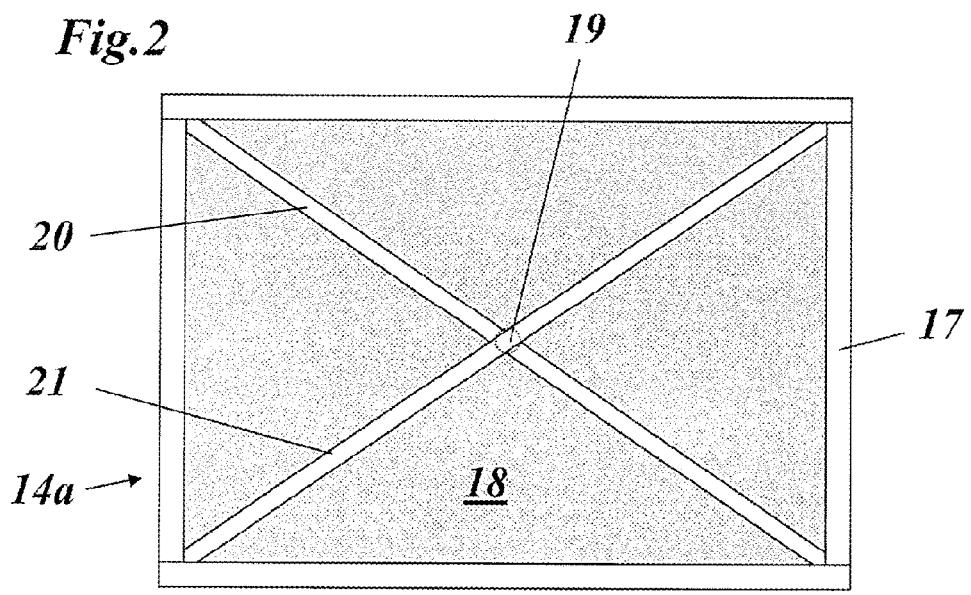
FIGS. 2-5 show in plan view, perpendicularly to the plane of the wall, different exemplary embodiments of wall elements according to the invention, which wall elements are equipped with piezoelements for the controlled change of the mechanical behavior and in which the piezoelements exert a force which is perpendicular to the plane of the wall.
Figure 3:
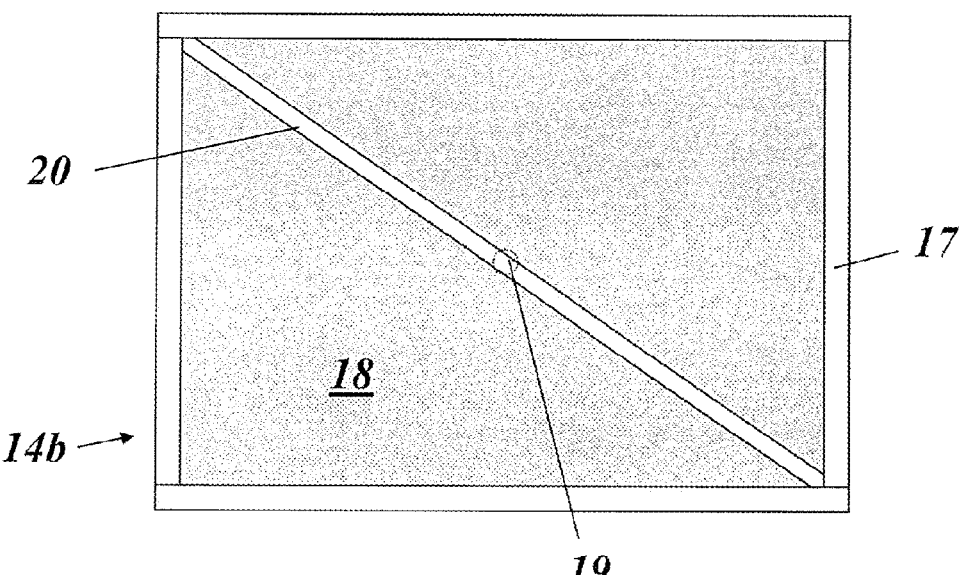
Figure 4:
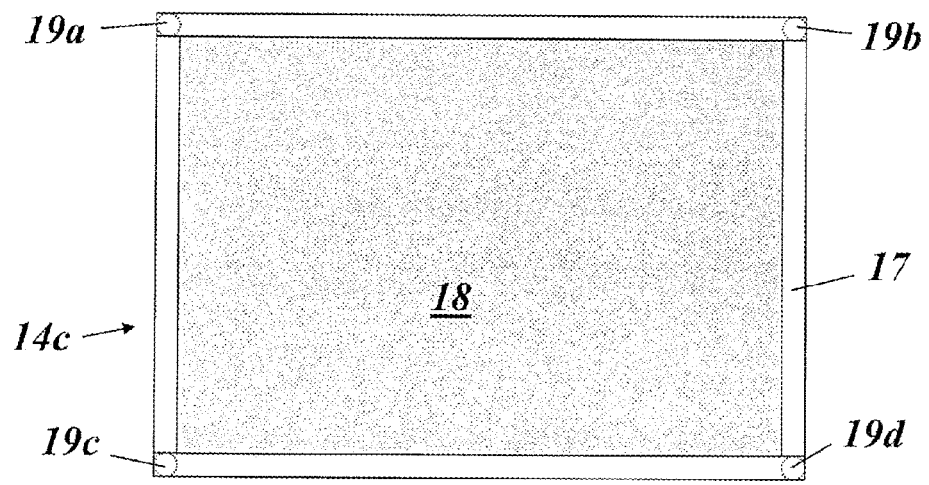
Figure 5:
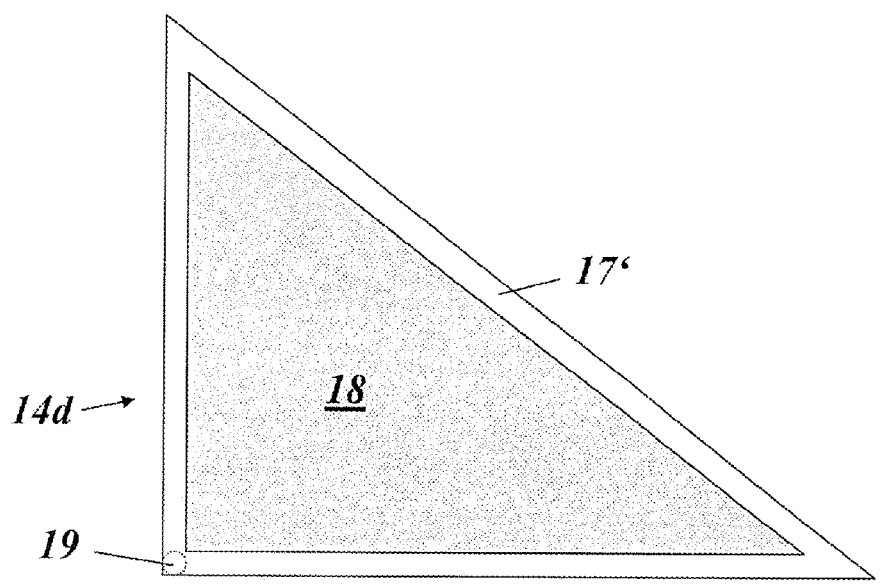

Shown in FIGS. 2-5, in plan view perpendicularly to the plane of the wall, are different exemplary embodiments of wall elements according to the invention, which are equipped with piezoelements for the controlled change of the mechanical behavior. The wall elements 14a-d are part of the walls 14 of the intake manifold 13 which is shown in FIG. 1. The wall elements comprise in each case a wall plate 18, preferably consisting of a sheet metal plate, which is connected to a stable frame 17 or 17' and so altogether forms a stable mechanical structure. The frame 17 in the cases of FIGS. 2-4 is rectangular. In the case of FIG. 5, the frame 17' is triangular. The frame 17 or 17' can be constructed from a standard square section, for example.

Whereas the wall elements 14c and 14d, apart from the frame 17 or 17', have no additional reinforcing elements, in the case of the wall element 14a of FIG. 2 provision is made for a reinforcement in the form of two diagonally extending stiffening girders 20 and 21 which cross in the center. In the case of the wall element 14b from FIG. 3, on the other hand, only one diagonal reinforcing element in the form of a stiffening girder 20 is provided.

In the examples of FIGS. 2-5, piezoelements 19 or 19a-d are drawn in as dotted circles. The location and number of the piezoelements 19 or 19a-d are only examples in this case. Naturally, within the scope of the invention additional (or even fewer) piezoelements can be attached at other selected points of the wall elements.

Figure 6A:
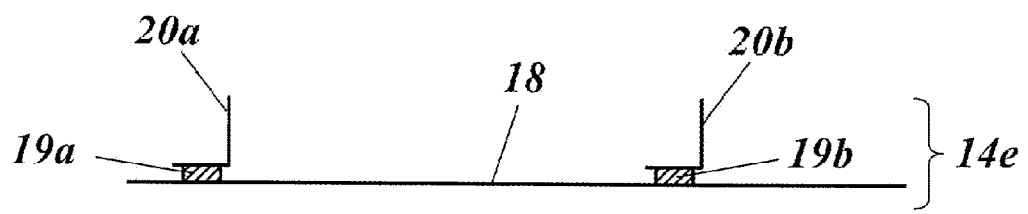
FIGS. 6a-6c show in section two exemplary embodiments of wall elements according to the invention, in which the piezoelements are arranged between the wall and stiffening girder.
Figure 6B:
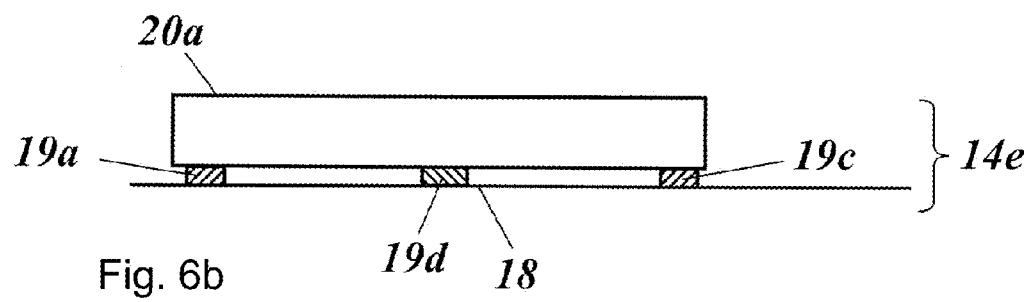
Figure 6C:
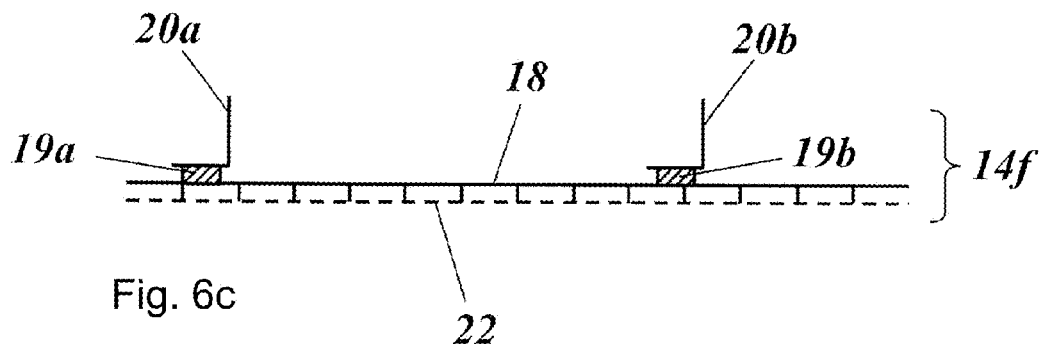
Figures 7A, 7B:
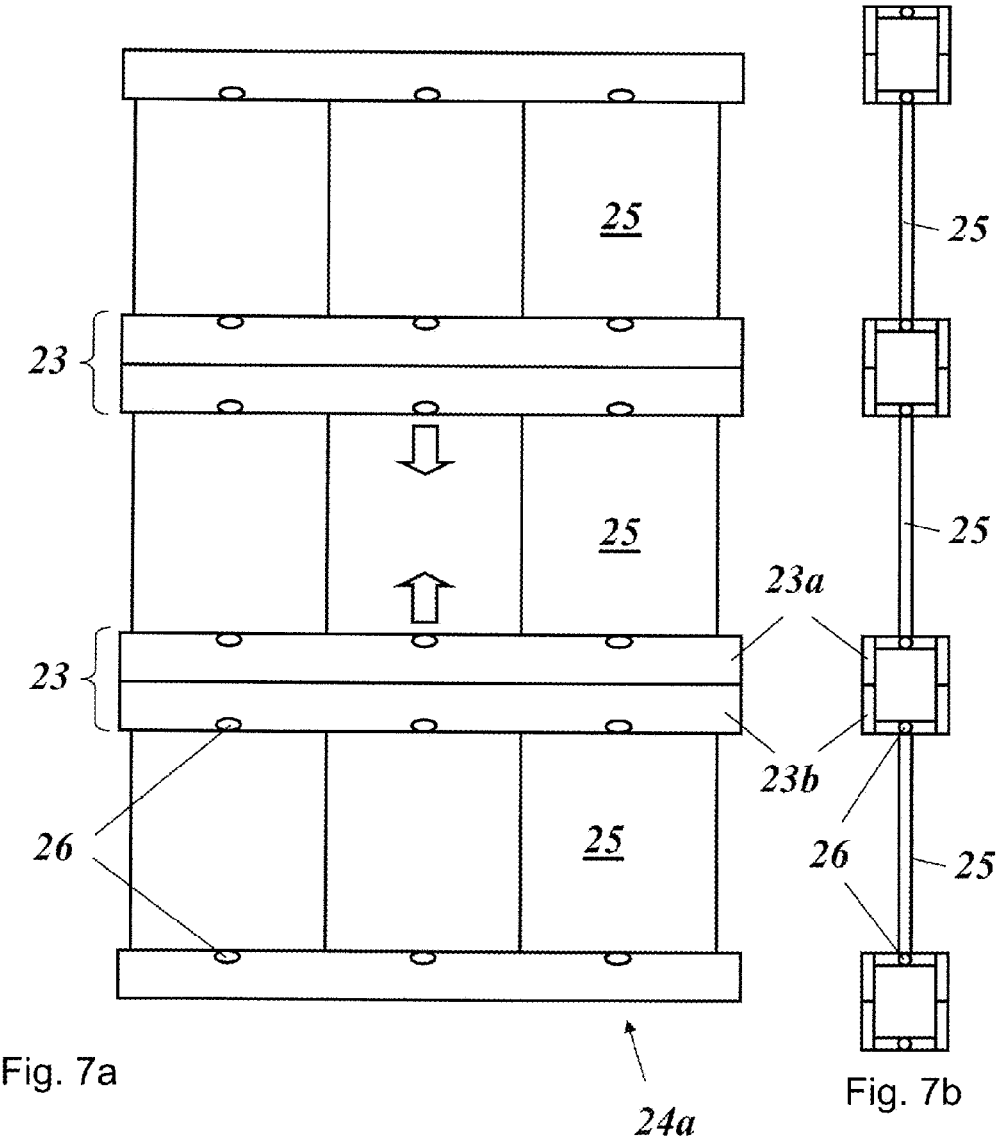
Figures 8A, 8B:
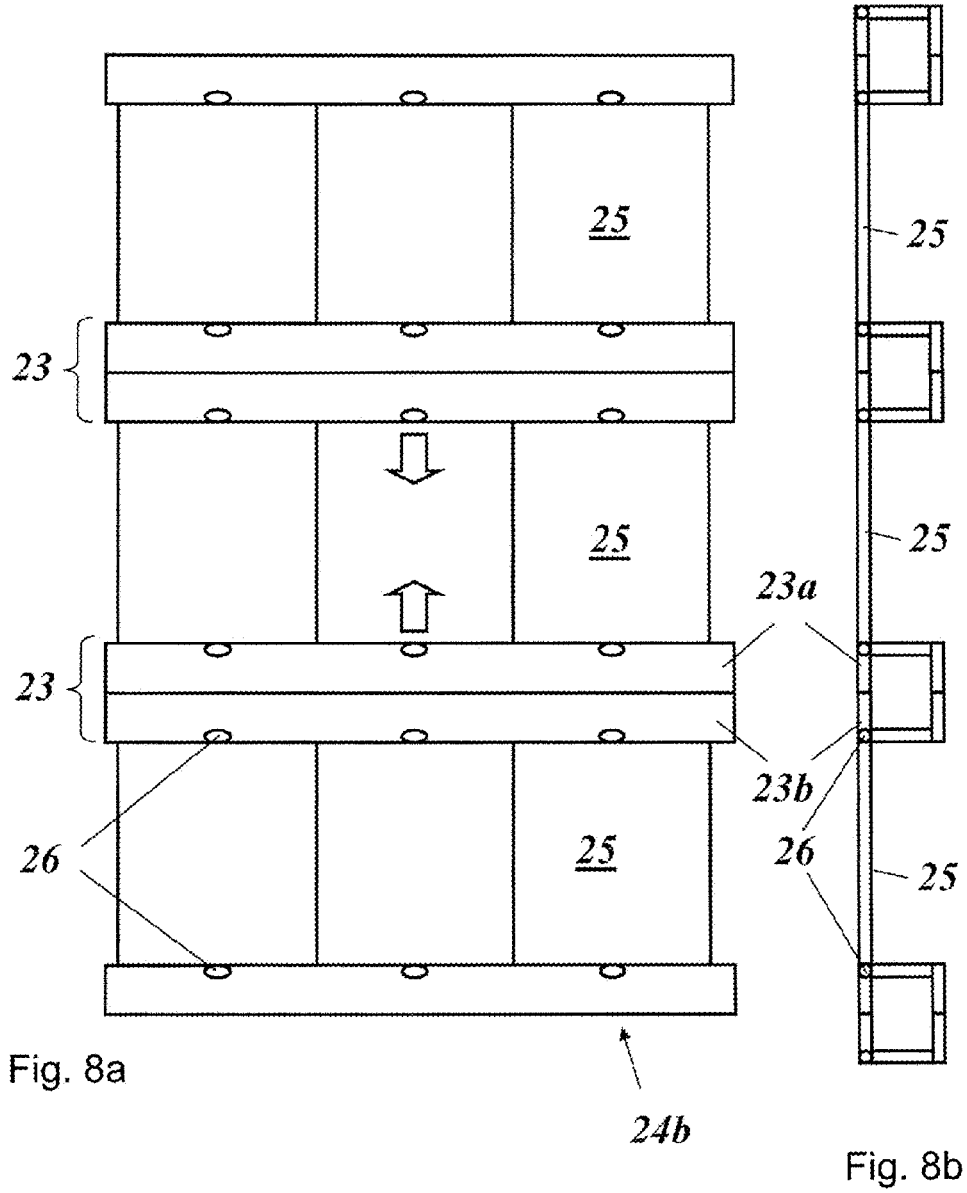

As becomes apparent with reference to FIGS. 6a-6c, the piezoelements 19 or 19a, b are arranged between the wall plates 18 and the reinforcing elements (in the case of FIGS. 6a-6c stiffening girders 20a, b which are angled in the shape of an L) so that upon receiving a control signal in a direction perpendicular to the plane of the plates the piezoelements exert forces upon the wall plates 18. If the wall plates 18 are immovably connected to the frame 17 or 17' at other points, the mechanical stress within the wall plates 18, and therefore their mechanical rigidity and natural frequency, is changed as a result of these forces being exerted. By means of the control unit 27 with the sound sensor 28, this change is carried out so that damping of the sound emitted via the wall plates 18 is achieved as a result.

According to FIGS. 6a-6c, the wall plate 18 can be the outer wall of the intake manifold 13 at the same time. In the case of a simpler construction of the wall, a cross section according to FIG. 6a is then the result. In FIG. 6b, the same configuration is shown, as seen in a direction transversely to the stiffening girders. Here, it is shown that a stiffening block 19d can additionally be arranged beneath the stiffening girder 20a between spaced apart piezoelements 19a and 19c in order to reinforce the bracing which is created. If the wall is of a doubled design (FIG. 6c), an inner wall 22 is additionally provided parallel to the wall plate or outer wall 18.

Figures 9A, 9B:
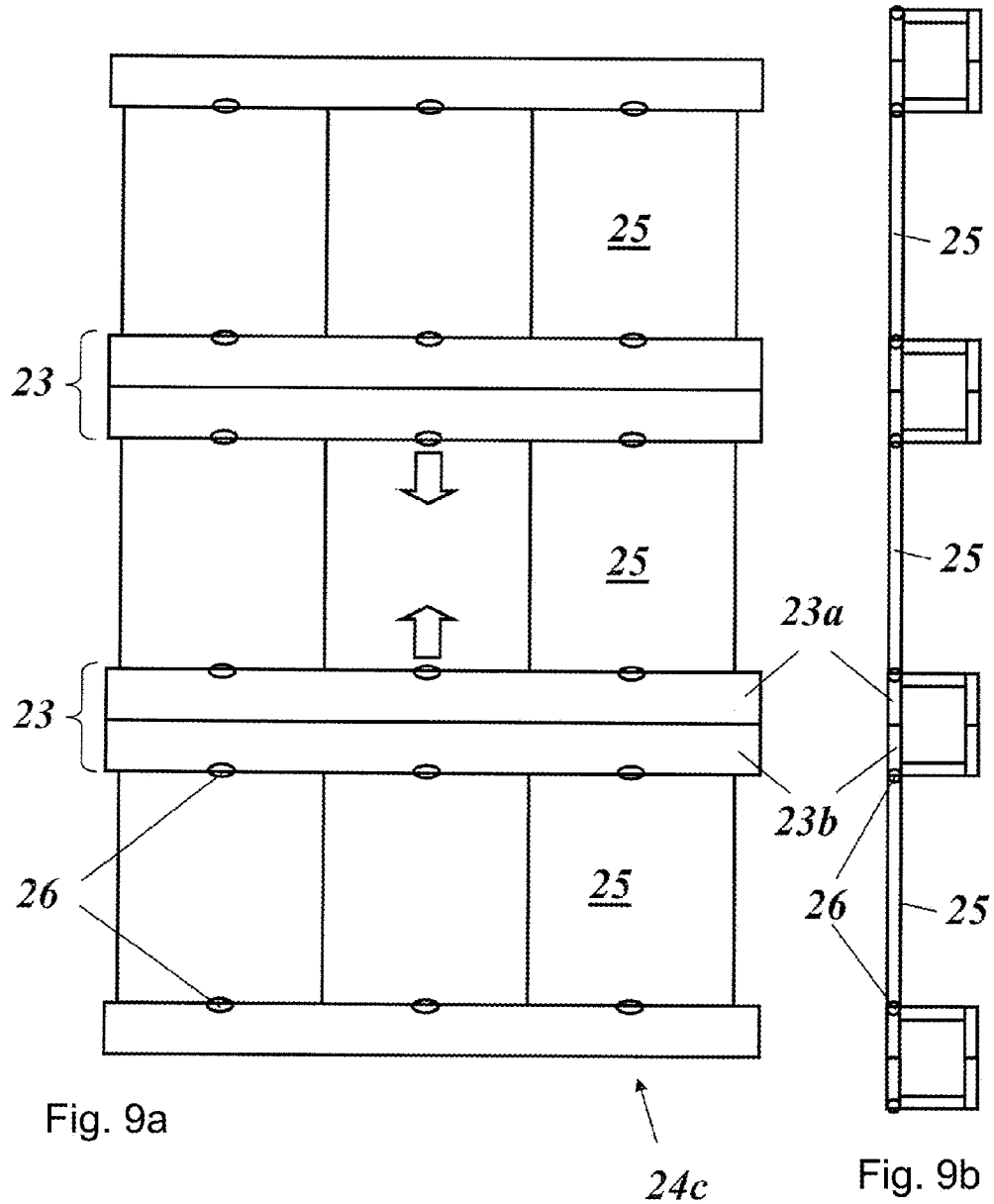

Other exemplary embodiments of the invention are reproduced in FIGS. 7a-9c in plan view (a) and in cross section (b). In the cases which are represented there, the inserted piezoelements 26 are arranged relative to the wall plates 25 so that they exert forces upon the wall plates 25 which are parallel to said plates (see the drawn-in arrows). The wall plates 25 are clamped-in in each case between oppositely disposed frames 23, wherein the frames 23 are assembled in each case from two U-sections 23a and 23b. In the case of the wall 24a of FIG. 7, the wall plates 25 are supported in the middle between the frames 23 and, by means of the piezoelements 26 which are arranged in the frames 23 on the edges of the wall plates, are acted upon by forces lying in the plane of the plates and consequently are changed in their mechanical rigidity or natural frequency. In the case of the wall 24b of FIG. 8, the wall plates 25 are displaced towards one side of the frames 23 and form the inner wall of the intake manifold 13. The piezoelements 26 in this case basically have the same position between wall element 25 and frame 23. In the case of the wall 24c of FIG. 9, compared with the wall 24b from FIG. 8, a change is created inasmuch that the piezoelements 26 are now arranged in each case between the wall plate 25 and the frames 23.

Also possible, however, is the case (not shown) in which the piezoelements are accommodated in the wall plates themselves.

The featured solution has the following advantages:
the construction is simple;
the fluidic design of the intake manifold in practice does not have to be altered;
the cable duct of the necessary cables is simple and robust;
the silencing means are easily accessible from the outside and can be simply maintained;
the means, furthermore, are easily modified and can thus be quickly adapted to the respective conditions.

LIST OF DESIGNATIONS

10 Gas turbine
11 Generator
12 Air intake
13 Intake manifold
14 Wall
14a-f Wall element
15 Air
16 Machine axis
17, 17' Frame
18 Wall plate
19, 19a-c Piezoelement
19d Stiffening block
20, 21 Stiffening girder
20a, b Stiffening girder
22 Inner wall
23 Frame
23a, b U-section
24a-c Wall
25 Wall plate (e.g. sheet metal)
26 Piezoelement
27 Control unit
28 Sound sensor

What is claimed is:

1. An intake manifold for inducting combustion air for a compressor of a gas turbine, the intake manifold comprising:
a plurality of walls that delimit against the environment;
devices are provided to controllably change a mechanical rigidity of the walls to reduce noise which is generated or is emitted in an air intake region during operation of the gas turbine;
wherein the devices for the controllable change of a mechanical rigidity of the walls comprise piezoelements which are connected to a control unit; and
wherein the walls comprise wall plates which, with the aid of frames and/or stiffening girders, are mechanically stiffened, the piezoelements are arranged at predetermined points between the wall plates and the frames or stiffening girders in such a way that as a result of their actuation the mechanical rigidity of the wall plates can be changed.

2. The intake manifold as claimed in claim 1, wherein at least one sound sensor is arranged in the air intake region of the gas turbine, and the sound sensor is connected to the control unit.

3. The intake manifold as claimed in claim 2, wherein the control unit is configured such that, by actuation of the piezoelements in accordance with a measured sound in the air intake region, it influences the rigidity of the walls so that sound in the air intake region is reduced.

4. The intake manifold as claimed in claim 1, wherein the piezoelements exert a force upon the wall plates which is directed perpendicularly to a plane of the plates.

5. The intake manifold as claimed in claim 1, wherein the piezoelements exert a force upon the wall plates which is directed parallel to the plane of the plates.

6. The gas turbine as claimed in claim 1, wherein the piezoelements are arranged between the wall plates and the frames.

7. The gas turbine as claimed in claim 1, wherein the piezoelements are arranged between the wall plates and the stiffening girders.

8. The gas turbine as claimed in claim 1, wherein each of the wall plates includes at least one stiffening girder, the at least one stiffening girder comprising at least one diagonal reinforcement member.

9. The gas turbine as claimed in claim 8, where the at least one diagonal reinforcement member comprises two diagonally extending reinforcement members, which cross in a center thereof.

10. The gas turbine as claimed in claim 1, wherein each of the wall plates includes at least one stiffening girder, the at least one stiffening girder being angled in a shape of an L, and wherein upon receiving a control signal from the control unit, at least one piezoelements exerts a force upon the wall plate, and wherein the force is directed perpendicularly to a plane of the wall plate.

11. The gas turbine as claimed in claim 1, wherein the walls are an outer wall of the air intake manifold.

12. The gas turbine as claimed in claim 11, comprising:
stiffening blocks arranged beneath the stiffening girders between spaced apart piezoelements.

13. A gas turbine, for inducting combustion air for a compressor, comprising:
an air intake to which air to be compressed is fed via an intake manifold, the intake manifold having a plurality of walls that delimit against the environment, wherein devices are provided to controllably change a mechanical rigidity of the walls to reduce noise which is generated or emitted in an air intake region during operation of the gas turbine;
wherein the devices for the controllable change of a mechanical rigidity of the walls comprise piezoelements which are connected to a control unit; and
wherein the walls comprise wall plates which, with the aid of frames and/or stiffening girders, are mechanically stiffened, the piezoelements are arranged at predetermined points between the wall plates and the frames or stiffening girders in such a way that as a result of their actuation the mechanical rigidity of the wall plates can be changed.

14. The gas turbine as claimed in claim 13, wherein at least one sound sensor is arranged in the air intake region of the gas turbine, the sound sensor is connected to the control unit.

15. The gas turbine as claimed in claim 14, wherein the control unit is configured such that, by actuation of the piezoelements in accordance with a measured sound in the air intake region, it influences the rigidity of the walls so that sound in the air intake region is reduced.

16. The gas turbine as claimed in claim 13, wherein the piezoelements exert a force upon the wall plates which is directed perpendicularly to a plane of the plates.

17. The gas turbine as claimed in claim 13, wherein the piezoelements exert a force upon the wall plates which is directed parallel to a plane of the plates.

\* \* \* \* \*